Figure 1:
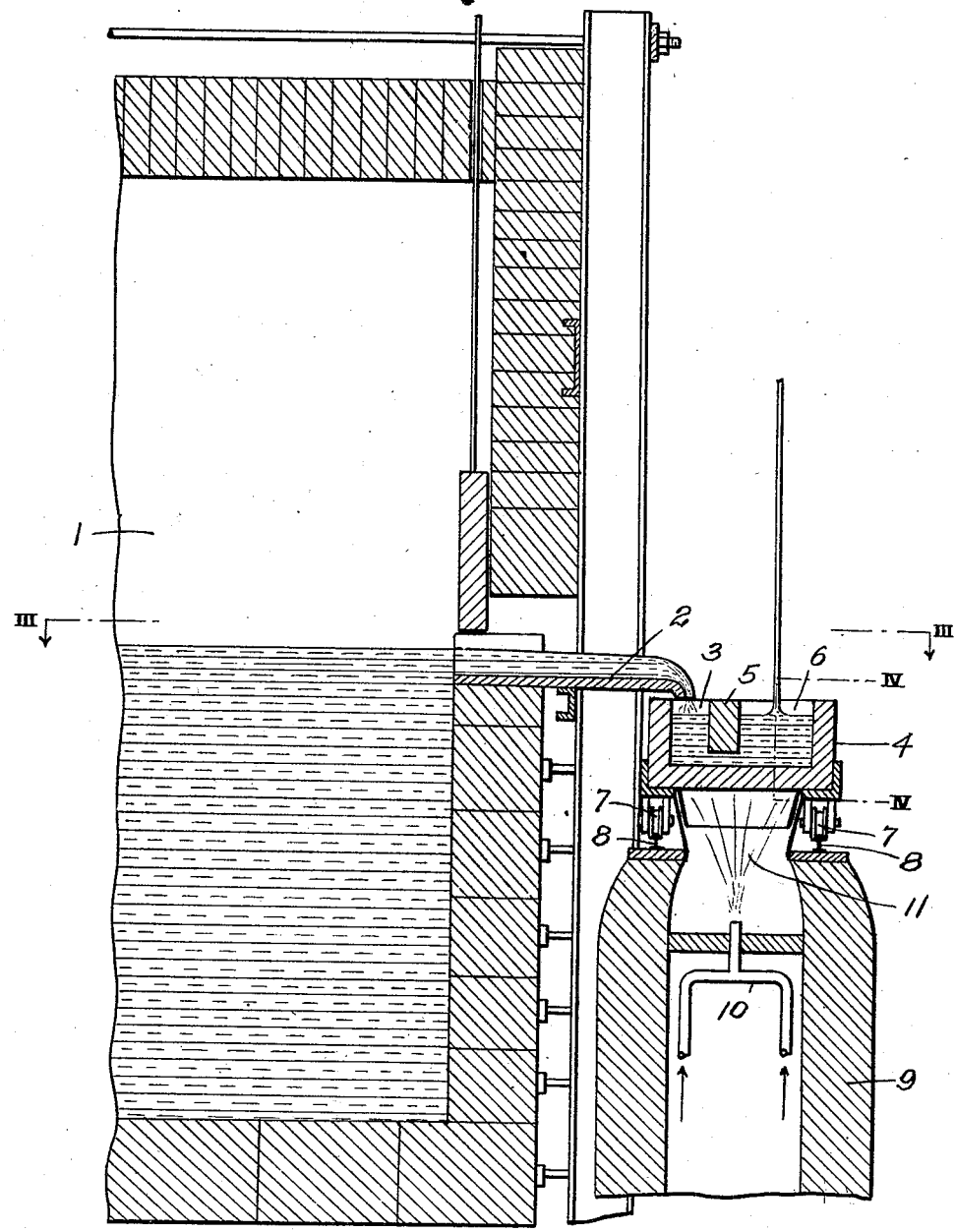

May 18, 1926.
C. H. HARDING
1,584,768
MANUFACTURE OF SHEET GLASS
Filed Feb. 8, 1926
2 Sheets-Sheet 2
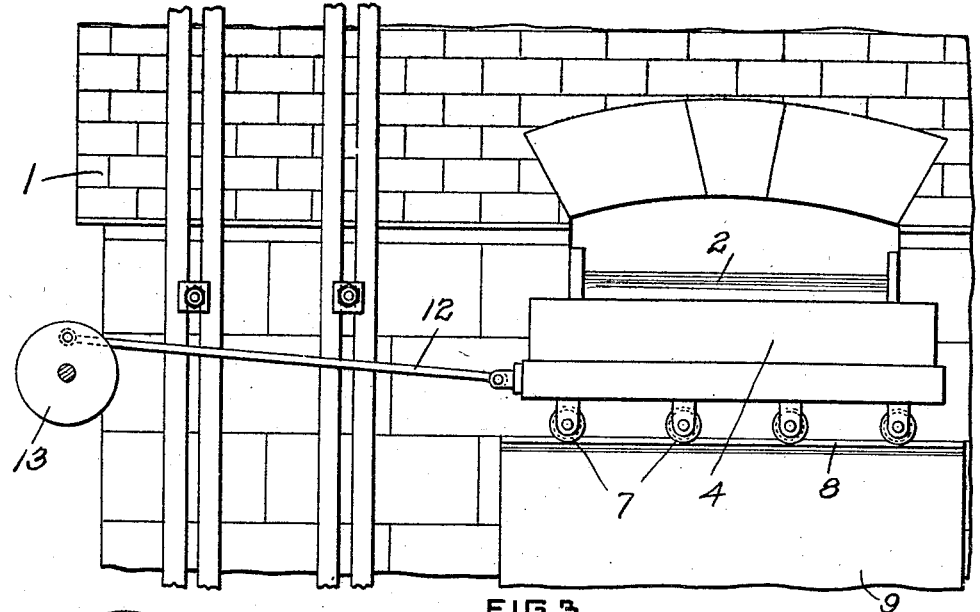
FIG.2.
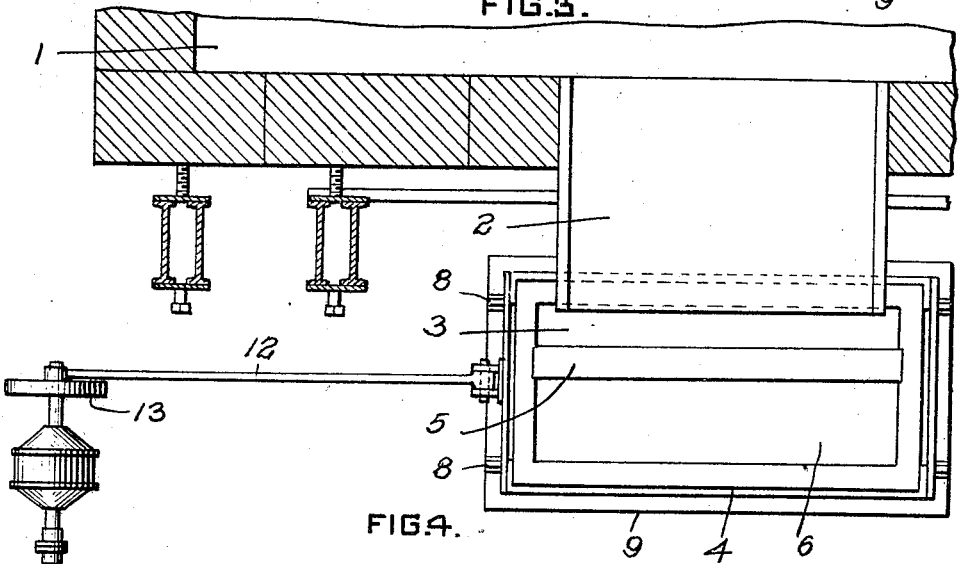
FIG.3.
FIG.4.
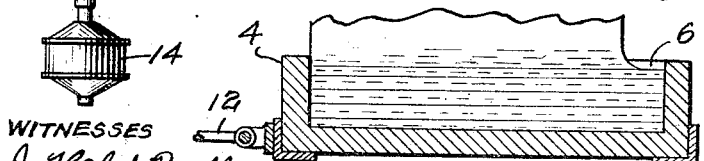
WITNESSES
J. Herbert Bradley.
Percy A. English.
INVENTOR
Charles H. Harding,
by Christy & Christy,
Attys.

Patented May 18, 1926.

1,584,768

UNITED STATES PATENT OFFICE.

CHARLES HENRY HARDING, OF FORT SMITH, ARKANSAS.

MANUFACTURE OF SHEET GLASS.

Application filed February 8, 1926. Serial No. 86,680.

It is the object of the invention to improve the operation of drawing glass in sheet form from a bath of molten glass so as to produce glass sheets or plates which are uniform in thickness, and in width as well, and having uniform optical qualities.

It is well known that in commercial manufacturing operations it is not practicable to obtain complete homogeneity in the body of molten glass from which the product is drawn. The molten bath contains both glass melted from fresh batch and glass melted from cullet, and the molten cullet is usually of a somewhat harder nature than the fresh glass, so that at the molten bath temperature its tenacity is greater. For these reasons, and in a measure from other causes as well, the glass sheets are streaky, having slight irregularities in thickness in different portions of their width, and thereby their optical properties are impaired. It is the primary object of the invention to so conduct the drawing operation as to minimize these irregularities, and thus to produce glass sheets or plates of superior quality.

In the accompanying drawings I have shown, so far as is necessary, apparatus and appliances suitable for the practice of the invention, but as the present state and skill of the art are adequate to provide various forms of suitable apparatus, the illustration is conventional only. Figure 1 is a view in longitudinal sectional elevation of the delivery end of a tank furnace, showing an associated drawing receptacle and its heating furnace or kiln in cross-sectional elevation. Figure 2 is a front elevation. Figure 3 is a plan view on the line III—III of Figure 1. Figure 4 is a longitudinal section on the line IV—IV of Figure 1, showing one relative position of the sheet and the drawing receptacle.

The molten glass may flow continuously from the tank 1 through the spout 2 into the receiving compartment 3 of the drawing receptacle 4, and thence under the curtain-wall 5 into the drawing compartment 6 of said receptacle. The drawing receptacle is provided with wheels 7 running on tracks 8 mounted on the opposite side walls of the heating kiln or furnace 9 to which heat is supplied by means of a burner or burners 10. The products of combustion pass through the mouth 11 of the kiln and impinge upon the bottom of the receptacle 4, thus maintaining the glass in the receptacle at the proper temperature for drawing.

The inside length of the drawing compartment 6 of the receptacle 4 is greater than the width of the sheet to be drawn, and pivotally connected to one end of the receptacle is a connecting-rod 12, which is pivotally connected at its opposite end to a crank-disk 13 driven by a motor 14, so that the drawing-receptacle 4 may be oscillated horizontally in the line of the width of the sheet being drawn.

The drawing apparatus, which is not shown in the drawings, may be of any suitable character, several forms being now well known and operated. In accordance with the foregoing description it is preferred that the drawing operation shall be continuous, but the invention may be practiced also in the intermittent drawing of successive sheets from receptacles which are filled, drained and refilled. It is also preferred that the line of the draw shall be continually shifting horizontally back and forth in its own direction (that is to say, in prolongation of its own length) during the drawing operation; but it will be understood that mechanism of well-known character may be used which will give the horizontal oscillation a temporary dwell at the opposite limits of the movement, or intermediately, as may be desired. But however specific practice of the invention may be varied, the effect of the operation will be not only to prevent streaks of thick-and-thin glass, but to at once neutralize, or minimize, the formation of thick-and-thin spots across the width of the sheet during the drawing operation. Thus there is produced sheet glass of uniform thickness, and consequently having superior optical properties.

The present invention also includes the operation of causing the opposite edges of the sheet being developed to come into, or practically into, contact with the opposite end walls of the drawing receptacle at the opposite limits of the oscillatory movements above described, as indicated in Figure 4. Such contacts being made at intervals, and in alternation at the opposite edges of the sheet, during the drawing operation, serve to prevent drawing in of the sheet, and to hold, or contribute in holding, the sheet at its full intended width. However, this feature is not essential to the practice of the invention in its broader aspect.

It will be obvious that with some forms of drawing apparatus the drawing-receptacle may be stationary and the drawing apparatus, or portions of it, may be shifted to cause the oscillation of the line of the development of the sheet, and that the particular apparatus employed forms no part of the invention.

I claim as my invention:

1. The method of manufacture of sheet glass which comprises developing the sheet from a body of molten glass and during the operation shifting the line of sheet-development in its own direction.

2. The method of manufacture of sheet glass which comprises developing the sheet from a body of molten glass and during the operation causing the line of sheet-development to oscillate in its own direction.

3. The method of manufacture of sheet glass which comprises drawing the sheet upwardly from a body of molten glass and during the operation shifting the line of the draw in its own direction.

4. The method of manufacture of sheet glass which comprises drawing the sheet upwardly from a body of molten glass and during the operation causing the line of the draw to oscillate in its own direction.

5. The method of manufacture of sheet glass which consists in supplying molten glass to a receptacle and drawing the sheet upwardly therefrom, and during the drawing operation causing the opposite edges of the sheet in alternation to make and break contact with the opposite walls of the receptacle.

In testimony whereof I have hereunto set my hand.

CHARLES HENRY HARDING.